(12) United States Patent
Graves et al.

(10) Patent No.: US 10,730,769 B2
(45) Date of Patent: Aug. 4, 2020

(54) COMPOSITION FOR WATER TREATMENT AND METHODS OF MANUFACTURE

(71) Applicants: Jan D. Graves, Norwalk, OH (US); Gregory D. Graves, Milan, OH (US)

(72) Inventors: Jan D. Graves, Norwalk, OH (US); Gregory D. Graves, Milan, OH (US)

(*) Notice: Subject to any disclaimer, the term of this patent is extended or adjusted under 35 U.S.C. 154(b) by 29 days.

(21) Appl. No.: 15/429,554

(22) Filed: Feb. 10, 2017

(65) Prior Publication Data

US 2018/0230030 A1 Aug. 16, 2018

(51) Int. Cl.
| | | |
|---|---|---|
| *C02F 1/72* | (2006.01) | |
| *A01N 25/12* | (2006.01) | |
| *C02F 11/148* | (2019.01) | |
| *A01N 25/34* | (2006.01) | |
| *A01N 59/00* | (2006.01) | |
| *C02F 1/50* | (2006.01) | |
| *C02F 1/68* | (2006.01) | |
| *C02F 101/16* | (2006.01) | |
| *C02F 103/00* | (2006.01) | |

(52) U.S. Cl.
CPC ............. *C02F 1/722* (2013.01); *A01N 25/12* (2013.01); *A01N 25/34* (2013.01); *A01N 59/00* (2013.01); *C02F 1/50* (2013.01); *C02F 1/687* (2013.01); *C02F 11/148* (2019.01); *C02F 2101/166* (2013.01); *C02F 2103/007* (2013.01); *C02F 2303/04* (2013.01); *C02F 2305/023* (2013.01)

(58) Field of Classification Search
CPC ..................................................... C02F 1/722
See application file for complete search history.

(56) References Cited

U.S. PATENT DOCUMENTS

| | | | | |
|---|---|---|---|---|
| 2004/0048762 A1* | 3/2004 | Stewart | ..................... | C02F 1/50 510/302 |
| 2005/0155936 A1* | 7/2005 | Martin | ................... | A01N 59/02 210/754 |
| 2008/0045436 A1* | 2/2008 | Zimmermann | ....... | C01B 15/106 510/446 |
| 2009/0069181 A1* | 3/2009 | Boulos | .................... | C02F 1/722 504/151 |
| 2009/0107925 A1* | 4/2009 | Burba | .................. | B01J 20/0207 210/764 |
| 2015/0057153 A1* | 2/2015 | DiTuro | ................. | C02F 1/5263 504/119 |

FOREIGN PATENT DOCUMENTS

CN 105078997 A * 11/2015

OTHER PUBLICATIONS

English machine translation of CN-105078997-A (Year: 2015).*

* cited by examiner

*Primary Examiner* — Peter F Godenschwager
(74) *Attorney, Agent, or Firm* — Benesch, Friedlander, Coplan & Aronoff LLP

(57) ABSTRACT

Compositions for treating bodies of water are disclosed herein. The water treatment composition can include sodium percarbonate, a binder, a fibrous material, and inert materials combined to form an integral product. The integral product can be in the form of a tablet. The binder can be vinylpyrrolidone-vinyl acetate copolymer, the fibrous material can be organic fibers, for example cotton fibers, and the inert material can be polyethylene glycol. The integral product can be between approximately 70 to 95 weight percent sodium percarbonate, between approximately 0.5 to 10.0 weight percent binder, between approximately 0.05 to 10.0 weight percent fibrous material, and between approximately 1.0 to 10.0 weight percent inert material. More specifically, the integral product can be approximately 91 weight percent sodium percarbonate, approximately 4.5 weight percent binder, approximately 1.0 weight percent fibrous material, and approximately 3.5 weight percent inert material. The integral product can be moisture free and water soluble.

17 Claims, 1 Drawing Sheet

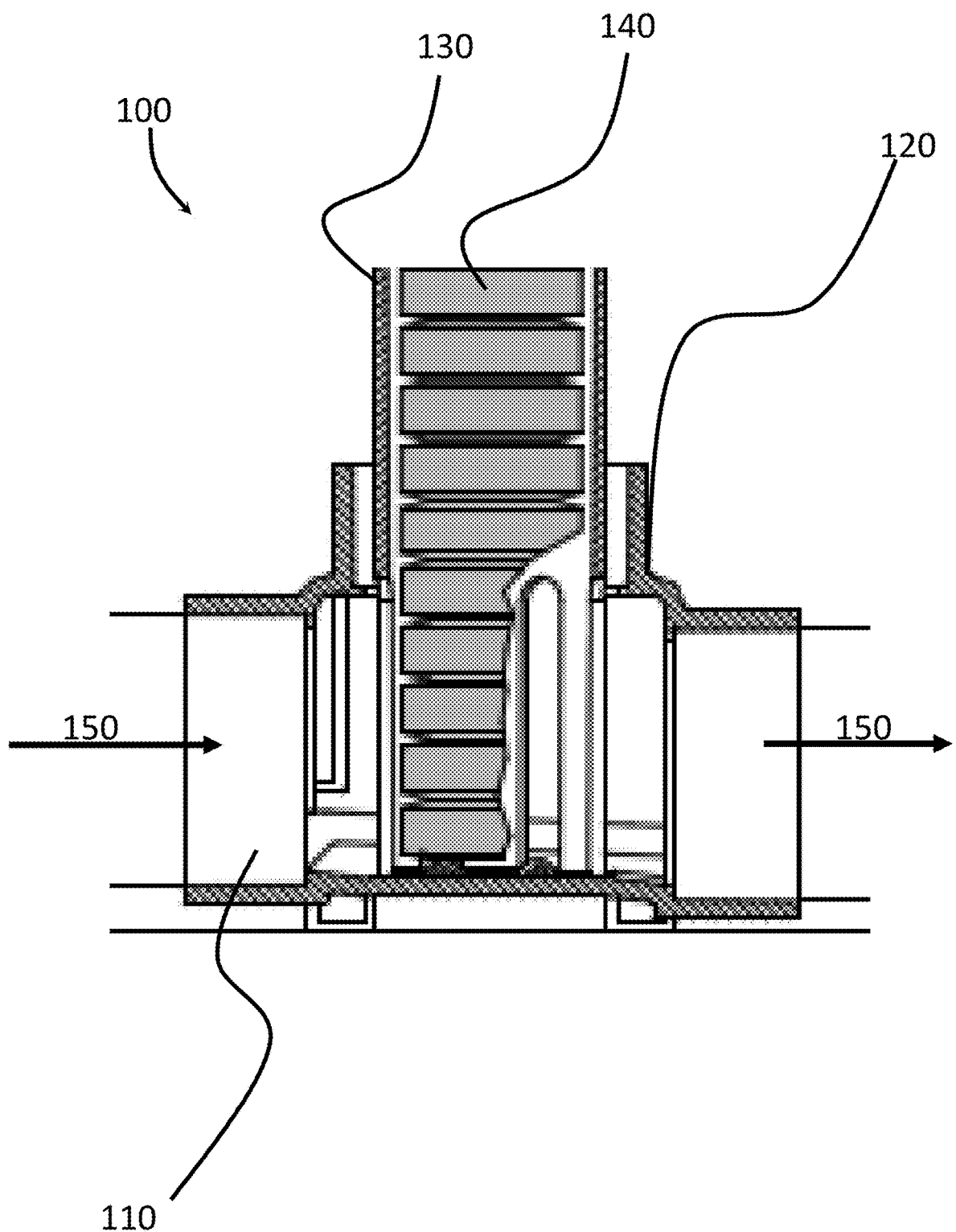

COMPOSITION FOR WATER TREATMENT AND METHODS OF MANUFACTURE

FIELD OF INVENTION

The present disclosure is directed to compositions, methods of forming such compositions, and methods of using such compositions to treat bodies of water. More specifically, the present disclosure is directed to compositions in the form of water soluble tablets, methods of forming such tablets, and methods for using such tablets to provide a disinfecting agent to a body of water and increase the level of oxygen in the body of water.

BACKGROUND

One attribute of water and other liquids is the amount of oxygen dissolved in the liquid. In many instances, the quality or usefulness of a liquid is in large part determined by the level of dissolved oxygen in the liquid. In general, dissolved oxygen refers to free non-compound oxygen present in a liquid. When oxygen is free and non-compound, each oxygen atom is bonded to only one other oxygen atom and not bonded in any other element. Such an arrangement forms an oxygen molecule ($O_2$). Therefore, dissolved oxygen is an oxygen molecule that is dissolved in a liquid such as water. The dissolved oxygen level of a liquid is the ratio of the amount of dissolved oxygen present in a given volume of the liquid. The level of dissolved oxygen is typically expressed as the weight of oxygen (typically in milligrams) per a volume of liquid (typically in liters).

As will be understood, the level of dissolved oxygen can be very important to the quality and usefulness of naturally-formed and man-made bodies of water such as lakes, ponds, streams, lagoons, reservoirs, retention ponds, holding tanks, settlement tanks, wastewater collected for treatment, and the like. In naturally-formed bodies of water, organisms such as plants, fish, amphibians, bacteria, etc. rely on dissolved oxygen in the body of water for respiration and other biologic functions. While the adequate amount of dissolved oxygen is based on many factors and varies for different bodies of water, generally, bodies of water require between 1 and 15 milligrams of dissolved oxygen per liter of water to sustain a healthy ecosystem to support various organisms.

In certain man-made bodies of water, including wastewater collected for treatment, controlling the level of dissolved oxygen can enable and enhance the treatment of wastewater. For example, certain wastewater treatment processes are aerobic, which means that the process relies on the presence of oxygen to break down organic matter present in the wastewater. Whether on a small scale, such as treating wastewater generated by a rural residential home, or on a large scale, such as a municipal wastewater treatment facility, insuring the presence of oxygen and controlling the oxygen level can be paramount to the effective operation of such aerobic treatment processes.

Conventionally, oxygen is dissolved into bodies of water through mechanical processes such as bubbling air into the water or agitating the water through churning to force air into the water. As will be appreciated, such processes typically require specialized equipment that is powered by electrical energy or by a machine driven by carbon-based energy sources. Thus, conventional methods can be very energy intensive. Furthermore, in such conventional methods, the specialized equipment must be procured and maintained, which adds additional costs. Additionally, agitation of water or bubbling of air into bodies of water can cause turbulence in the body of water, which may be undesirable or detrimental to certain bodies of water such as lakes, ponds and settlement tanks.

Another attribute of water and other liquids is the amount of bacteria and other undesirable organisms in the liquid. In many instances, it is desirable to eliminate or at least reduce the amount of bacteria in a body of water. Bacteria can propagate disease, harm organisms, and contaminate nutrients and other substances that come into contact with the bacteria. Many bodies of water that benefit from proper dissolved oxygen levels can also benefit from the elimination or reduction of bacteria and other undesirable organisms.

There is a need for novel methods and compositions for increasing or controlling the level of dissolved oxygen in bodies of water that overcome the limitations of the prior art. Additionally, there is a need for novel methods and products for providing a disinfecting or antibacterial agent in a body of water.

SUMMARY

Compositions for treating bodies of water or wastewater are disclosed herein. In one embodiment, the water treatment composition includes an active ingredient, a binder, a fibrous material, and an inert material combined to form an integral product. The integral product can be in the form of a tablet. In one embodiment the active ingredient is a compound with a peroxide group, for example sodium percarbonate. In another embodiment, the active ingredient includes a carbonate salt, for example sodium carbonate. In one embodiment the binder is vinylpyrrolidone-vinyl acetate copolymer, the fibrous material is organic fibers, for example cotton fibers, and the inert material is polyethylene glycol. The integral product can be between approximately 70 to 95 weight percent active ingredient, between approximately 0.5 to 10.0 weight percent binder, between approximately 0.05 to 10.0 weight percent fibrous material, and between approximately 1.0 to 10.0 weight percent inert material. More specifically, in one embodiment the integral product can be approximately 91 weight percent active ingredient, approximately 4.5 weight percent binder, approximately 1.0 weight percent fibrous material, and approximately 3.5 weight percent inert material. Generally, the integral product is moisture free and dissolvable in water or wastewater.

Methods of forming a water treatment composition are disclosed herein. In one embodiment, the method includes the steps of providing an active ingredient, a binder, a solvent, a fibrous material, and an inert material. The method further includes the steps of blending the active ingredient, fibrous material, and inert material into a mixture, and dissolving the binder in the solvent to form a liquid binder. The liquid binder is dispersed throughout the mixture, and the combination is dried. The method further includes placing the dried combination into a mold, and applying a pressure to form an integral product. In one embodiment, the integral product is a tablet. In one embodiment, the active ingredient is a compound with a peroxide group, for example sodium percarbonate. In another embodiment, the active ingredient includes a carbonate salt, for example sodium carbonate. In one embodiment the binder is vinylpyrrolidone-vinyl acetate copolymer, the solvent is an alcohol-based solvent, for example ethanol, the fibrous material comprises organic fibers, for example cotton fibers, and the inert material is polyethylene glycol. The integral product can be between approximately 70 to 95 weight percent active ingredient, between approximately 0.5 to 10.0 weight percent binder, between approximately 0.05 to 10.0 weight percent fibrous material, and between approximately 1.0 to 10.0 weight percent inert material. More specifically, in one embodiment the integral product can be approximately 91 weight percent active ingredient, approximately 4.5 weight percent binder, approximately 1.0 weight percent fibrous material, and approximately 3.5 weight percent inert material. The weight percentage of the binder to solvent can be between approximately 5 percent and 55 percent, and in one embodiment can be approximately 46 percent. When the active ingredient is sodium percarbonate, the sodium percarbonate can be provided in powder form. The combination of liquid binder and mixture can be dried at below 35° C. and results in the formation of granules. The pressure applied to form an integral product is between 10,000 kilograms and 20,000 kilograms, and can result in an integral product with a density between 1.0 and 1.5 grams per cubic centimeter. Generally, the integral product is moisture free and dissolvable in water or wastewater.

Methods of treating bodies of water or wastewater are disclosed herein. In one embodiment, the method includes providing one or more water treatment compositions comprising a compound with a peroxide group or a carbonate salt, a binder, a fibrous material, and an inert material, where the compound, binder, the fibrous material, and the inert material are combined into the form of an integral product, and immersing the integral product into a body of water or wastewater. The integral product can be in the form of a tablet. The method can include a dispensing apparatus for holding tablets such that the step of immersing the tablets into a body of water or wastewater is accomplished by immersing the dispensing apparatus into the body of water or wastewater. The dispensing apparatus can be arranged such that when tablets are placed in the apparatus the tablets form a vertical column. The apparatus can be further arranged so that when tablets fully dissolve in the body of water or wastewater, gravity moves remaining tablets downward toward the body of water or wastewater. Although embodiments are described as including tablets, where those tablets are arranged in a dispensing apparatus as a vertical column, it will be understood by those skilled in the art upon reading and understanding this disclosure that treatment compositions and dispensing apparatus can take on any number of arrangements, configurations, and forms while remaining within the scope of this disclosure. For example, the treatment composition can be in the form of a powder, granules, blocks, sheets, or integral products that take on shapes and forms other than tablets. Dispensing apparatuses can hold and dispense the treatment compositions in any variety of ways as well.

BRIEF DESCRIPTION OF THE DRAWINGS

In the accompanying drawing, structures are illustrated that, together with the detailed description provided below, describe example embodiments of the claimed invention. Where appropriate, like elements are identified with the same or similar reference numerals. Elements shown as a single component may be replaced with multiple components. Elements shown as multiple components may be replaced with a single component. The drawing may not be to scale. The proportion of certain elements may be exaggerated for the purpose of illustration.

FIG. 1 is a schematic illustration depicting in partial cross-section a tablet dispensing apparatus in accordance with one embodiment of this disclosure.

DETAILED DESCRIPTION

The compositions, arrangements, and methods disclosed in this document are described in detail by way of examples and with reference to the FIGURES. It will be appreciated that modifications to disclosed and described examples, arrangements, configurations, components, elements, apparatus, methods, materials, compositions, etc. can be made and may be desired for a specific application. In this disclosure, any identification of specific compositions, techniques, arrangements, methods etc. are either related to a specific example presented or are merely a general description of such a composition, technique, arrangement, method, etc. Identifications of specific details or examples are not intended to be and should not be construed as mandatory or limiting unless specifically designated as such. Selected examples of novel compositions and methods for providing a disinfecting agent in a body of water, while increasing and controlling the level of dissolved oxygen in the body of water are hereinafter disclosed and described in detail with reference made to FIG. 1.

Various methods and compositions are described herein for providing: a disinfecting agent in a body of water, increasing or controlling the level of dissolved oxygen in the body of water, and controlling the pH level in a body of water. Although the examples described herein include compositions and methods of manufacturing such compositions that take the form of a tablet, it will be understood by those of ordinary skill in the art upon reading and understanding this disclosure that the compositions and methods of manufacturing those compositions described herein can also take a form other than those described herein. For example, in addition to compositions that are in the form of tablets, the compositions can take a variety of forms, such as for example pillars, blocks, sheets, wafers, powders, granules, and the like. As will be further discussed, the form of the composition can be chosen to apply to specific circumstances or to achieve specific results.

The present disclosure describes a composition in the form of a tablet that can provide a disinfection influence on a body of water. Additionally, compositions and products disclosed herein can be useful in introducing oxygen into the body of water, and specifically, are useful in introducing oxygen in a manner that encourages dissolution of the oxygen in the body of water and controlling the pH level of the body of water. Furthermore, the compositions and products can be arranged to provide a disinfecting influence and introduce oxygen to bodies of water in a controllable and regulated manner.

Throughout this disclosure, the terms "water" or "body of water" will not only be used in their strict sense, but will also be used to describe liquids that only partially comprise water. For example, wastewater generated by the use of water in a residential home can include many substances other than water, such as biological materials, soil, and detergents; however, such wastewater will be included in the definitions of water and wastewater as used herein.

One exemplary composition or product takes the form of a tablet that includes one or more active ingredients and a binder that binds the active ingredients into a final tablet form. The tablet can also include one or more materials that improve the structural integrity and mechanical strength of the tablet, and can further include one or more inert materials. In one example, the active ingredient can be a compound that includes a peroxide group. As used herein, a compound that includes a peroxide group means a compound that includes oxygen-oxygen single bonds (O—O) or a peroxide anion. Hydrogen peroxide is an exemplary compound that includes a peroxide group. Hydrogen peroxide can be further combined with other elements or compounds to form additional compounds that include a peroxide group. One such example is sodium percarbonate. Sodium percarbonate is an adduct of sodium carbonate and hydrogen peroxide, with a chemical formula of $2Na_2CO_3 \cdot 3H_2O_2$. In one example the binder can be a liquid copolymer binder comprised of a powdered copolymer dissolved in a solvent. The material providing improved structural integrity and mechanical strength of the tablet can be a fibrous material. The inert material can be a variety of materials including a polymer or other synthetic material or naturally occurring materials.

One method of using a tablet comprised of the above ingredients is to immerse the tablet in a body of water that is to be treated. When the tablet is immersed in the body of water, the tablet can be arranged to controllably dissolve to provide a disinfecting agent for the body of water and subsequently provide oxygen molecules for dissolution in the body of water to increase the level of dissolved oxygen in the body of water.

The properties of sodium percarbonate make it a good candidate for the active ingredient in the compositions described herein. Sodium percarbonate is stable at a range of typical temperatures and storage conditions. Sodium percarbonate can be pressed or otherwise compiled along with additional ingredients into a tablet or other bulk form. Sodium percarbonate is dissolvable in water. When sodium percarbonate is immersed in water, it dissolves to yield its two components of sodium carbonate (also known as soda ash) and hydrogen peroxide, as seen in Formula 1 below.

$$2Na_2CO_3 \cdot 3H_2O_2 \rightarrow 2Na_2CO_3 + 3H_2O_2 \quad \text{[Formula 1]}$$

Once released into the body of water, hydrogen peroxide acts generally as a disinfecting agent and specifically as an antibacterial agent to kill bacteria. As will be understood, eliminating or reducing bacteria can be a useful process for many different types of bodies of water. In one example, for wastewater generated by a rural residential home, the wastewater is often treated near the home, and, once treated, is spread in a leach field, also near the home. As will be understood, the wastewater generated by the home often includes a substantial level of bacteria. The addition of hydrogen peroxide with its antibacterial properties to the wastewater can beneficially reduce or eliminate the level of bacteria in the post-treatment wastewater that is subsequently spread in a leach field near the home.

Hydrogen peroxide can be generally described as unstable in water. However, hydrogen peroxide decomposes relatively slowly in water, thus providing a substantial antibacterial and general disinfecting influence on bodies of water. The hydrogen peroxide decomposition process releases oxygen molecules over time that dissolve into the water and raise the level of dissolved oxygen in the body of water. The other byproduct of the decomposition of hydrogen peroxide is simply water. Formula 2 below illustrates the decomposition of hydrogen peroxide.

$$2H_2O_2 \rightarrow 2H_2O + O_2 \quad \text{[Formula 2]}$$

As will be understood, sodium percarbonate in a tablet form that can be immersed in a body of water yields both a disinfecting agent in a body of water and subsequently increases the level of dissolved oxygen in the body of water. Additional embodiments are described below regarding additional ingredients in such a tablet and methods of forming the tablet.

Generally, compounds that include a peroxide group can be useful in treating bodies of water in a number of ways. In one example, compounds with a peroxide group can be used to treat wastewater. Wastewater is a complex body of water and as such a number of "sum parameters" have been developed to characterize wastewater. Examples of such sum parameters are biological oxygen demand (BOD), chemical oxygen demand (COD), and total organic carbon (TOC). Various tests can be run to estimate the BOD, COD, and TOC for a body of water, and the results of such tests can be used to determine best methods for treating such bodies of water. BOD estimates the amount of oxygen required for microorganisms to biodegrade organic compounds in a body of water. COD estimates the amount of oxygen required to oxidize chemicals in a body of water. TOC estimates the level of organic carbon in a body of water. Results of such tests can be compared to the actual amount of oxygen in the body of water to determine if there is sufficient oxygen to properly treat the water. It will be understood that if it is determined that wastewater does not contain enough oxygen to treat the wastewater, products and methods described herein can be used to increase the level of oxygen in the wastewater to effectuate proper treatment of the wastewater. Products and methods described herein can be used on an ongoing basis in certain wastewater treatment facilities or can be used periodically depending on the results of testing of oxygen levels. Additionally, products and methods described herein can be used when a treatment plant experiences a high volume of wastewater, such as after a storm, or when other oxidization equipment fails or is in repair.

Additional specific uses for products and methods described herein include the reduction or removal of nitrites ($NO_2$) from bodies of water. Nitrites in a body of water can be oxidized by exposure to dissolved oxygen. Upon oxidation, nitrite reduces to a nitrate ($NO_3$). Oxidation can also be used to control, reduce or even eliminate the growth of algae, odor, or the general toxicity of a body of water. Specific applications of the products and methods described herein include dissolving oxygen in raw wastewater as it enters a wastewater treatment plant to increase the oxygen level and decrease the toxicity of the raw wastewater. It will be understood that increased oxygen level and decreased toxicity can assist in the treatment of wastewater once it enters a treatment plant. Another specific application is the use of products and methods described herein in septic tanks. Foul smelling compounds such as hydrogen sulfide often collect in septic tanks. Introducing oxygen into the septic tank can control odor by reducing hydrogen sulfide. Another specific application is the removal of iron and magnesium from bodies of water. Oxygen introduced into bodies of water can bond with iron and magnesium and cause the iron and magnesium to precipitate in solid form from the body of water.

In another embodiment of the products and methods described herein, the active ingredient is a carbonate salt. Upon the immersion of the product into a body of water, a carbonate salt is released into the body of water. In one example, the carbonate salt is sodium carbonate. The binder can be adjusted to control the amount of carbonate salt released over time. Such an arrangement can be used to control the pH level of the body of water. Increasing the pH level provides for more oxygen in the body of water, and reducing the pH level lowers the level of oxygen in the body of water.

A tablet can be manufactured such that the tablet has relatively robust physical integrity and mechanical strength such that it can withstand storage, shipping, and handling of the tablet. In one embodiment, where sodium percarbonate in powder form is used as the main ingredient, a binder can be used to create an adhesion force to amalgamate the powdered sodium percarbonate into granules, and such granules of sodium percarbonate and binder can subsequently be pressed into a tablet form. In one example, a binder in liquid form can be evenly mixed with and distributed throughout the powdered sodium percarbonate to promote the amalgamating of the sodium percarbonate into granules.

One such liquid binder is a solution of a copolymer powder dissolved in a solvent. For example, vinylpyrrolidone-vinyl acetate copolymer in powder form can act as the binding agent and can be dissolved in an alcohol-based solvent such as ethanol, methanol, or propanol. The ratio of vinylpyrrolidone-vinyl acetate copolymer to alcohol-based solvent can be from approximately 5.0 percent by weight to approximately 55.0 percent by weight. Once the liquid binder is formed, it can be combined with the powdered sodium percarbonate and distributed evenly throughout the sodium percarbonate to promote adhesion and binding into uniform granules. The ratio as a weight percentage of sodium percarbonate to liquid binder are typically large. For example, the ratios can range from about 90 percent to about 99 percent by weight of sodium percarbonate. In one embodiment, the solvent selected to form the liquid binder contains no water. Because sodium percarbonate is dissolvable in water, using a solvent with no water content provides for a more stable tablet.

As will be understood, it can be beneficial to form tablets in a manner that limits or eliminates defects and the effects of those defects, such as capping, cracking, and chipping of the tablet. One method of limited defects and the effects of defects is to improve the structural integrity and mechanical strength of a tablet by including fibers in the mixture of sodium percarbonate and binder prior to pressing the composition into a tablet. Fibers can serve as a matrix into which the sodium percarbonate granules can embed and adhere. The fibers can further serve to absorb and distribute forces applied to the tablet to better manage the applied forces. Examples of fibers that can be used in the mixture of sodium percarbonate and binder include cotton fibers, sisal fibers, microcrystalline cellulose, and other such organic fibers. In one example, the length of the fibers can range between about 500 micrometers and 1500 micrometers. In another example, the length of the fibers can be about 900 micrometers. Additionally, it will be understood that many plant-based biodegradable fibers or synthetic fibers can be used to increase the structural integrity and mechanical strength of a tablet formed from sodium percarbonate and a binding agent.

Additional inert materials can be used as fillers to complete the composition. In one example, the inert material can be a polymer such as a polyethylene glycol, which is known by the tradename carbowax. Carbowax is in essence a water soluble wax. It will be understood that other materials can be used with or in place of carbowax such as, for example, paraffin waxes, and polyfins.

An exemplary tablet can be manufactured from the following ingredients: 70 to 95 weight percent sodium percarbonate; 0.5 to 10.0 weight percent binder (i.e., this weight percent represents the final weight percent of binder, during the process of forming the tablet, the binder in liquid form can be as higher weight percent of the ingredients); 0.05 to 10.0 weight percent organic fibers; and 1.0 to 10.0 weight percent inert material. As discussed above, in one embodiment the liquid binder can be vinylpyrrolidone-vinyl acetate copolymer dissolved in an alcohol-based solvent, the organic fiber can be cotton fibers, and the inert material can be carbowax.

A method of forming the tablet comprises the steps of mixing the dry sodium percarbonate powder with any fibers and inert materials; preparing a liquid binding solution; dispensing the liquid binder throughout the mixture to form a damp mixture; completely drying the damp mixture at a temperature below approximately 35° C. to form granules (i.e., solvent of liquid binder and any other liquids content evaporates); dispensing the dried mixture into a mold; and pressing the granules into a tablet at a pressure of, for example, between 10,000 kilograms to 20,000 kilograms. The resulting tablet can have a density from 1.0 to 1.5 gram/cm$^3$. In an alternative method, the liquid binder is added to the powdered sodium percarbonate and thoroughly mixed, and subsequently any fibrous material and/or inert material is added to the mixture before pressing. Once the tablets have been formed, the tablets can be wrapped and packaged in preparation for storage or shipping.

Pressure applied to form the tablet can be varied. For example, applied pressures can range from about 1.4 kilograms per square millimeter to about 28.7 kilograms per square millimeter. Good results have been obtained by using about 5.6 kilograms per square millimeter.

In one specific example, the liquid binder is prepared by mixing 6.75 grams of vinylpyrrolidone-vinyl acetate copolymer powder with 10.5 ml of pure ethanol. Also mixed together is 132.1 g of sodium percarbonate, 5.08 g of carbowax and 1.45 g of cotton fiber. Then the binder solution is dispensed to the powder mixture. After mixing, this damp mixture is dried at 15° C. until the mixture reaches a complete dryness. The powder mixture is then placed into a tableting press and pressed at 20,000 kilograms pressure force.

In such an embodiment, the weight percentages for the initial ingredients is as follows: sodium percarbonate comprises by weight approximately 86.2 percent of the tablet; the liquid binder solution comprises by weight approximately 9.6 percent of the tablet; the cotton fibers comprise by weight approximately 0.9 percent of the tablet; and the carbowax comprises by weight approximately 3.3 percent of the tablet. Because the mixture is dried during processing, the ethanol evaporates during processing. Therefore, for this embodiment, the weight percentages of the final tablet are as follows: sodium percarbonate comprises by weight approximately 90.9 percent of the tablet; the copolymer binder comprises by weight approximately 4.6 percent of the tablet; the cotton fibers comprise by weight approximately 1.0 percent of the tablet; and the carbowax comprises by weight approximately 3.5 percent of the tablet.

The manufacturing processes described herein can form not only tablet shaped products, but also pillar shaped products, i.e., a cylindrical product where the height of the product is approximately as large or larger than the diameter of the product. In certain embodiments, the product can be between 50 millimeters and 80 millimeters in diameter, and the product can be between 15 millimeters and 50 millimeters in height. In addition, compositions and products can take the form of sheets, wafers, powders, granules, and the like based on certain conditions and circumstances. For instance, if a set of circumstances demanded water treatment over a long period of time without requiring the continued replacement of products, a large block can be formed that is immersed in a body of water to dissolve over an extended period. The rate of dissolution of the block can be controlled by the amount of surface area of the block exposed to the body of water. Wafers and sheets can also be used to increase the amount of surface area exposed to the body of water so as to control the rate of dissolution of the composition. Additionally, a treatment composition in granular form can be used to control the rate of dissolution. That is to say that the amount of granules exposed to a body of water over time can be selected to control the dissolution of the granules, and thus, control the release of a disinfecting agent and subsequent molecular oxygen into a body of water.

In addition to the amount of surface area exposed to the body of water, the composition of the ingredients of the tablet or other form of treatment composition can be adjusted or arranged to control the dissolution rate of the treatment composition. For example, a tablet can be arranged such that the tablet dissolves at a slower rate and releases disinfecting hydrogen peroxide and subsequent oxygen molecules at a slower rate into a body of water. Conversely, the tablet can be arranged such that the tablet dissolves at a faster rate and releases disinfecting hydrogen peroxide and subsequent oxygen molecules at a faster rate into a body of water. For example, the more copolymer as a weight percentage that is included in the tablet, the greater the adhesion forces securing the sodium percarbonate granules together. It will be understood that under such an arrangement, the tablet will dissolve at a slower rate, and thus, the tablet will release disinfecting hydrogen peroxide and subsequent oxygen molecules into the water more slowly. Conversely, the less copolymer as a weight percentage that is included in the tablet, the lesser the adhesion forces securing the sodium percarbonate granules together. It will be understood that under such an arrangement, the tablet will dissolve at a faster rate, and thus, the tablet will release disinfecting hydrogen peroxide and subsequent oxygen molecules into the water more rapidly.

One method of introducing the tablet to a body of water is to place the tablet in an inflowing fluid stream entering the body of water. One example of such an arrangement is the inflow fluid stream entering a wastewater treatment tank through an inflow or inlet pipe. Tablets can be placed into the inflow pipe, and the tablet can dissolve as the inflowing wastewater passes over the tablet. It will be understood that the rate of the tablet dissolution can also be controlled in part by the fluid flow rate through the inlet pipe.

FIG. 1 schematically illustrates an exemplary dispensing apparatus 100 in partial cross-section. The dispensing apparatus 100 is arranged to hold tablets and can be inserted into an inflow pipe 110 leading to a wastewater treatment tank. The tablet dispensing apparatus 100 includes a housing 120 and feeder tube 130 that can be selectively slid inside and removed from the housing 120. The feeder tube 130 is arranged so that multiple tablets 140 can be inserted into the feeding tube 130. As illustrated, the tablets 140 are positioned or stacked one on top of another to form a column of tablets 140, with some tablets 140 immersed in the fluid stream and some tablets 140 above the fluid stream. As illustrated by arrows 150, wastewater flows from left to right with respect to FIG. 1. As the wastewater flows, it comes into contact with the tablets 140 immersed in the inlet stream, and the tablets 140 slowly dissolve to release hydrogen peroxide and soda ash into the inflowing wastewater. The hydrogen peroxide will have an immediate disinfecting and antibacterial effect on the wastewater and will subsequently decompose into oxygen molecules that will dissolve into the wastewater to increase the dissolved oxygen level of the wastewater. It will be understood that as the tablets 140 are immersed in the inlet stream fully dissolve, gravity will draw the tablets 140 above down into the inlet stream to continue the process. As will be understood, the tablet dispensing apparatus 100 can be restocked with tablets from the top of the feeder tube 130 without having to remove the tablet dispensing apparatus 100 from the inflow pipe 110.

In the arrangement illustrated in FIG. 1, the dissolution rates of the tablets 140 can be generally controlled by the weight percentage of copolymer binder included in the tablet 140. For example, for a flow rate of between 0.5 and 1 gallons per minute, if the tablet 140 has a copolymer binder content of approximately 1.5 percentage by weight, the average dissolution rate is approximately 616 grams per day. If the tablet 140 has a copolymer binder content of approximately 3.0 percentage by weight, the average dissolution rate is approximately 435 grams per day. If the tablet 140 has a copolymer binder content of approximately 4.4 percentage by weight, the average dissolution rate is approximately 362 grams per day. As this data illustrates, the dissolution rate is inversely proportional to the weight percentage of copolymer binder in the tablet. Therefore, tablets can be specifically designed and formed for specific conditions to accommodate different systems with different flow rates and different disinfecting and oxygenation needs.

Additional dispensing apparatuses can be used with the treatment compositions described herein. For example, if the treatment composition is used in granular form, the granules can be placed in a container comprised of a housing with openings large enough to allow water to flow through but small enough to restrain undissolved granules. For example, a mesh made of wire or other material can be used as the housing of such a dispensing apparatus. As will be understood, such a housing can be inserted into the inlet stream of a wastewater treatment process. The amount of treatment composition dissolved into the wastewater can be controlled by the about of treatment composition exposed to the inlet stream.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A water treatment composition comprising:
   sodium percarbonate in an amount that is between approximately 70 to 95 weight percent of an integral product;
   a binder;
   a fibrous material comprising cotton fibers; and
   an inert material;
   wherein the sodium percarbonate, binder, the fibrous material, and the inert material are combined into the form of the integral product.

2. The water treatment composition of claim 1, wherein the form of the integral product is a tablet.

3. The water treatment composition of claim 1, wherein the binder is vinylpyrrolidone-vinyl acetate copolymer.

4. The water treatment composition of claim 1, wherein the fibrous material further comprises additional organic fibers.

5. The water treatment composition of claim 4, wherein the additional organic fibers are at least one of sisal fibers and microcrystalline cellulose.

6. The water treatment composition of claim 1, wherein the inert material is polyethylene glycol.

7. The water treatment composition of claim 1, wherein:
the binder is between approximately 0.5 to 10.0 weight percent of the integral product;
the fibrous material is between approximately 0.05 to 10.0 weight percent of the integral product; and
the inert material is between approximately 1.0 to 10.0 weight percent of the integral product.

8. The water treatment composition of claim 7, wherein:
the sodium percarbonate is approximately 91 weight percent of the integral product;
the binder is approximately 4.5 weight percent of the integral product;
the fibrous material is approximately 1.0 weight percent of the integral product; and
the inert material is approximately 3.5 weight percent of the integral product.

9. The water treatment composition of claim 1, wherein the binder is between approximately 0.5 to 10.0 weight percent of the integral product.

10. The water treatment composition of claim 1, wherein the fibrous material is between approximately 0.05 to 10.0 weight percent of the integral product.

11. The water treatment composition of claim 1, wherein the inert material is between approximately 1.0 to 10.0 weight percent of the integral product.

12. The water treatment composition of claim 1, wherein the sodium percarbonate is approximately 91 weight percent of the integral product.

13. The water treatment composition of claim 1, wherein the binder is approximately 4.5 weight percent of the integral product.

14. The water treatment composition of claim 1, wherein the fibrous material is approximately 1.0 weight percent of the integral product.

15. The water treatment composition of claim 1, wherein the inert material is approximately 3.5 weight percent of the integral product.

16. The water treatment composition of claim 1, wherein the integral product is generally moisture free.

17. The water treatment composition of claim 1, wherein the integral product is dissolvable in water.

* * * * *